(12) United States Patent
Ito et al.

(10) Patent No.: US 10,065,643 B2
(45) Date of Patent: Sep. 4, 2018

(54) VEHICLE TRAVEL CONTROL APPARATUS

(71) Applicant: TOYOTA JIDOSHA KABUSHIKI KAISHA, Toyota-shi, Aichi (JP)

(72) Inventors: Tatsuya Ito, Toyota (JP); Takayoshi Nohara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/475,911

(22) Filed: Mar. 31, 2017

(65) Prior Publication Data

US 2017/0305422 A1  Oct. 26, 2017

(30) Foreign Application Priority Data

Apr. 26, 2016 (JP) ................. 2016/088064

(51) Int. Cl.
*B60W 30/16* (2012.01)
*B60W 50/14* (2012.01)
(Continued)

(52) U.S. Cl.
CPC ...... *B60W 30/16* (2013.01); *B60W 30/18163* (2013.01); *B60W 50/0097* (2013.01);
(Continued)

(58) Field of Classification Search
USPC .......................................... 701/48
See application file for complete search history.

(56) References Cited

U.S. PATENT DOCUMENTS 5,341,142 A * 8/1994 Reis ...................... F41G 7/2226
244/3.15
5,521,579 A * 5/1996 Bernhard ........... B60K 31/0008
180/167
(Continued)

FOREIGN PATENT DOCUMENTS

DE 102009007885 A1 8/2010
EP 2562060 A1 2/2013
(Continued)

OTHER PUBLICATIONS

Oct. 5, 2017 Search Report issued in European Patent Application No. 17162691.4.

*Primary Examiner* — Jean Paul Cass
(74) *Attorney, Agent, or Firm* — Oliff PLC

(57) ABSTRACT

In a vehicle travel control apparatus configured to determine a target acceleration of an own vehicle based on an inter-vehicle distance to a predicted cutting-in vehicle predicted to cut in between the own vehicle and a following target vehicle as well as an inter-vehicle distance to the following target vehicle, it is necessary to notify a driver of the presence of the predicted cutting-in vehicle at an appropriate timing. A cutting-in probability, which is a probability that the predicted cutting-in vehicle carries out the cutting in, is acquired, and information on the predicted cutting-in vehicle is notified to the driver from a time point when a state where the cutting-in probability is higher than a start probability threshold has continued for a predetermined period to a time point when a state where the cutting-in probability is lower than an end probability threshold has continued for a predetermined period.

4 Claims, 9 Drawing Sheets

(51) Int. Cl.
  *B60W 50/00* (2006.01)
  *B60W 30/18* (2012.01)
(52) U.S. Cl.
  CPC ....... *B60W 50/14* (2013.01); *B60W 2050/143* (2013.01); *B60W 2050/146* (2013.01); *B60W 2420/52* (2013.01); *B60W 2510/18* (2013.01); *B60W 2520/105* (2013.01); *B60W 2550/302* (2013.01); *B60W 2550/304* (2013.01); *B60W 2550/306* (2013.01); *B60W 2550/308* (2013.01); *B60W 2710/18* (2013.01); *B60W 2720/106* (2013.01); *B60W 2750/302* (2013.01); *B60W 2750/304* (2013.01); *B60W 2750/306* (2013.01); *B60W 2750/308* (2013.01)

(56) References Cited

U.S. PATENT DOCUMENTS

| | | | |
|---|---|---|---|
| 7,124,027 B1* | 10/2006 | Ernst, Jr. | B60W 30/09 701/301 |
| 7,451,005 B2* | 11/2008 | Hoffberg | G05B 15/02 700/83 |
| 8,165,776 B2* | 4/2012 | Sugawara | B60W 30/12 340/436 |
| 8,457,827 B1 | 6/2013 | Ferguson et al. | |
| 9,475,491 B1* | 10/2016 | Nagasaka | B60W 30/16 |
| 9,676,389 B2* | 6/2017 | Clarke | B60W 30/18163 |
| 9,714,035 B2* | 7/2017 | Matsuda | B60W 50/0097 |
| 9,715,695 B2* | 7/2017 | de Souza | G06Q 30/0202 |
| 9,728,228 B2* | 8/2017 | Palmer | G11B 27/105 |
| 9,738,156 B2* | 8/2017 | Plante | B60K 35/00 |
| 9,761,067 B2* | 9/2017 | Plante | G07C 5/085 |
| 9,791,545 B2* | 10/2017 | Rhoads | G01S 5/18 |
| 9,830,665 B1* | 11/2017 | Healy | G06Q 40/08 |
| 9,842,437 B2* | 12/2017 | Biemer | G07C 5/008 |
| 9,847,043 B1* | 12/2017 | Fields | B60W 50/14 |
| 9,855,817 B2* | 1/2018 | Hsiao | H01M 10/6566 |
| 9,883,209 B2* | 1/2018 | Ricci | H04W 4/21 |
| 9,888,885 B2* | 2/2018 | An | A61B 5/747 |
| 9,898,162 B2* | 2/2018 | Jisrawi | G06F 3/04817 |
| 2003/0093187 A1* | 5/2003 | Walker | B64C 13/20 701/1 |
| 2005/0187713 A1* | 8/2005 | Yamamura | B60K 26/021 701/301 |
| 2006/0206246 A1* | 9/2006 | Walker | G06Q 10/00 701/16 |
| 2007/0069873 A1 | 3/2007 | Kudo | |
| 2008/0243351 A1 | 10/2008 | Isogai et al. | |
| 2011/0130936 A1* | 6/2011 | Noda | G08G 1/163 701/70 |
| 2012/0310465 A1* | 12/2012 | Boatright | B60Q 1/346 701/25 |
| 2013/0184926 A1* | 7/2013 | Spero | B62D 1/28 701/26 |
| 2013/0226432 A1* | 8/2013 | Tsuruta | B60W 30/165 701/96 |
| 2014/0207325 A1* | 7/2014 | Mudalige | B62D 15/025 701/26 |
| 2014/0309849 A1* | 10/2014 | Ricci | B60Q 1/00 701/33.4 |
| 2015/0151725 A1* | 6/2015 | Clarke | B60W 30/28 701/28 |
| 2015/0202770 A1* | 7/2015 | Patron | G05D 1/024 700/245 |
| 2015/0210274 A1* | 7/2015 | Clarke | B60W 30/00 382/104 |
| 2015/0321699 A1* | 11/2015 | Rebhan | B60Q 9/00 701/23 |
| 2015/0339570 A1* | 11/2015 | Scheffler | G06N 3/04 706/16 |
| 2016/0068156 A1* | 3/2016 | Horii | B60W 30/00 701/28 |
| 2016/0284218 A1 | 9/2016 | Ejiri | |
| 2017/0057492 A1* | 3/2017 | Edgington | B60K 28/066 |

FOREIGN PATENT DOCUMENTS

| | | |
|---|---|---|
| JP | 2004-058918 A | 2/2004 |
| JP | 2004-164315 A | 6/2004 |
| JP | 2005-250660 A | 9/2005 |
| JP | 2007-091025 A | 4/2007 |
| JP | 2011-006007 A | 1/2011 |
| JP | 2013-019598 A | 1/2013 |
| JP | 2014-041434 A | 3/2014 |
| JP | 2014-148293 A | 8/2014 |
| JP | 2015-099469 A | 5/2015 |

* cited by examiner

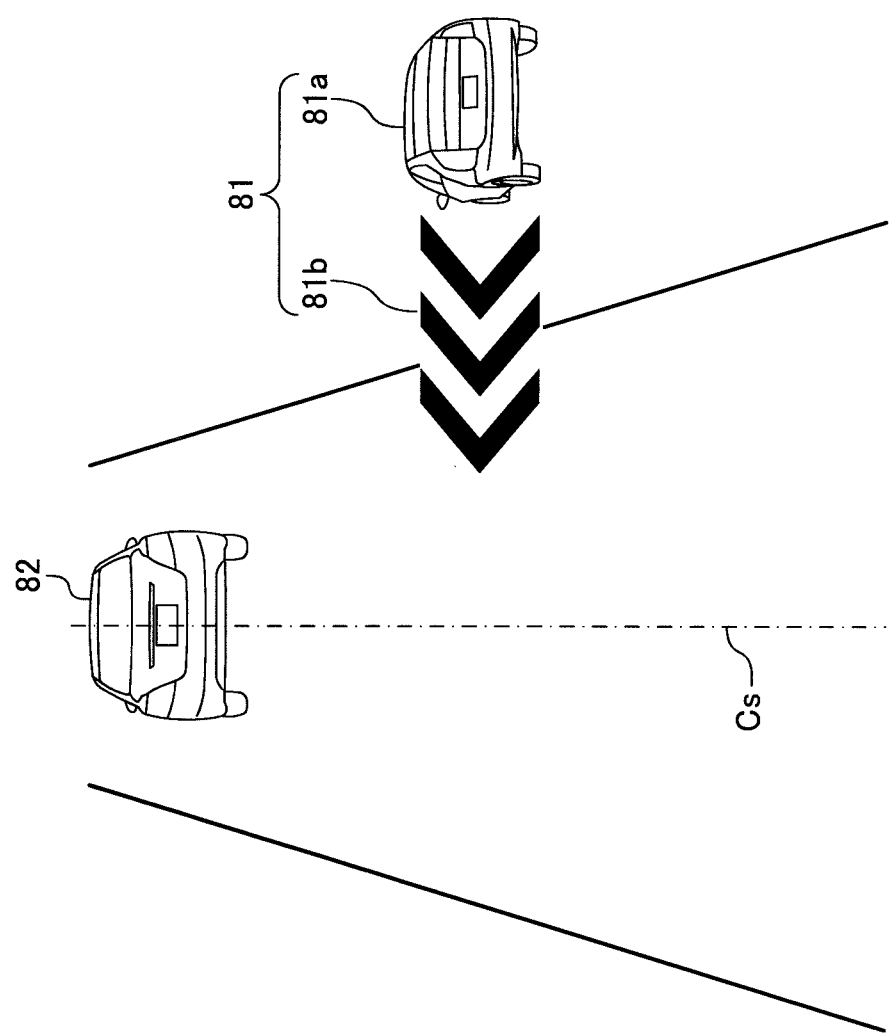

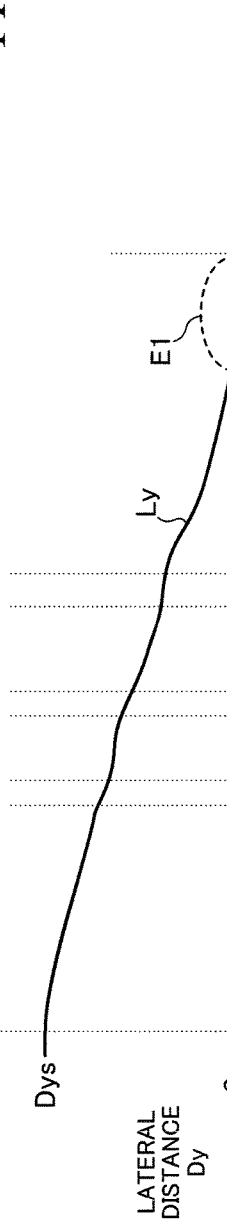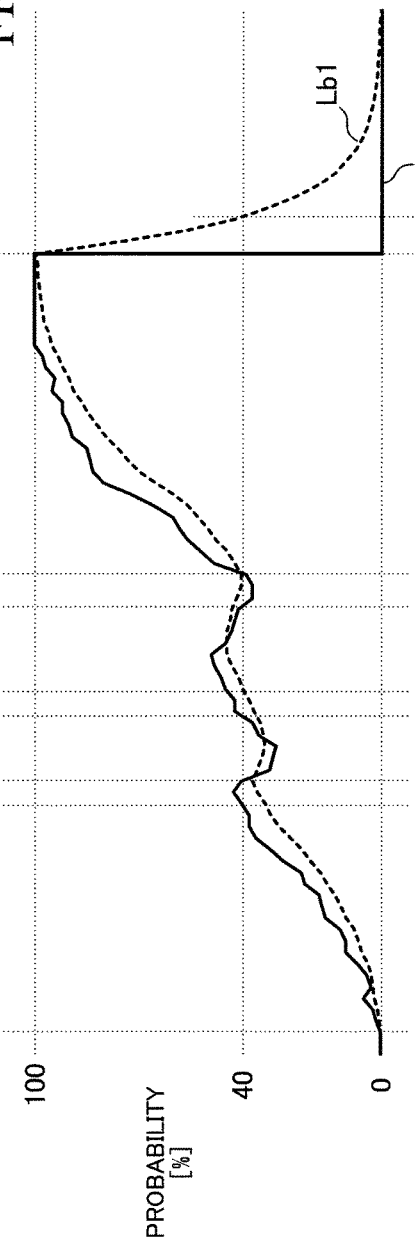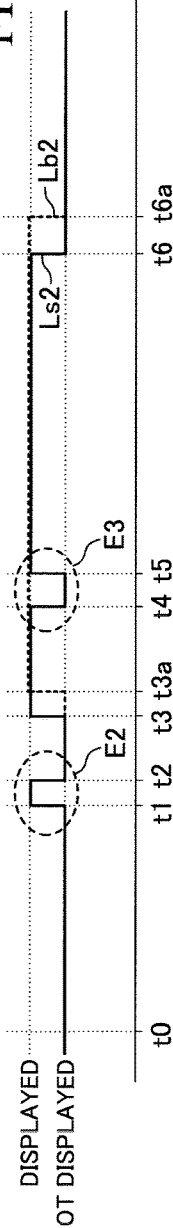

VEHICLE TRAVEL CONTROL APPARATUS

BACKGROUND OF THE INVENTION

1. Field of the Invention

The present invention relates to a vehicle travel control apparatus configured to control an own vehicle to travel while following a following target vehicle traveling ahead of the own vehicle so as to maintain a predetermined inter-vehicle distance to the following target vehicle.

2. Description of the Related Art

One vehicle travel control apparatus of this type (hereinafter referred to as "related-art apparatus") known hitherto is configured to predict that, when another vehicle is moving toward between the own vehicle and the following target vehicle under a state where the own vehicle is following the following target vehicle, the another vehicle cuts in between the own vehicle and the following target vehicle. In addition, the related-art apparatus is configured to calculate a target acceleration for another vehicle (predicted cutting-in vehicle) when the related-art apparatus predicts that the another vehicle cuts in, and use the target acceleration to control an acceleration of the own vehicle (for example, refer to Japanese Patent Application Laid-open No. 2014-148293).

In other words, under a state where the related-art apparatus detects presence of the predicted cutting-in vehicle, the acceleration of the own vehicle changes even when the vehicle speed of the following target vehicle and the inter-vehicle distance between the following target vehicle and the own vehicle do not change. Therefore, if the driver does not notice the presence of the predicted cutting-in vehicle when the acceleration of the own vehicle changes, there is a fear that the driver may feel a sense of discomfort.

On the other hand, the predicted cutting-in vehicle may return to an original lane immediately after the start of the cutting-in (before completion of the cutting-in). Thus, if the presence of the predicted cutting-in vehicle is simply notified to the driver when the predicted cutting-in vehicle is identified, the notification may be stopped immediately after the notification starts. In other words, when the presence of the predicted cutting-in vehicle is notified to the driver, the notification needs to be carried out at an appropriate timing.

However, in the related-art apparatus, notifying the driver of the presence of the predicted cutting-in vehicle at an appropriate timing is not considered.

SUMMARY OF THE INVENTION

The present invention has been made in view of the above-mentioned problem, and it is therefore one of objects of the present invention to provide a vehicle travel control apparatus capable of notifying a driver of presence of a predicted cutting-in vehicle at an appropriate timing.

In order to attain the above-mentioned objects, a vehicle travel control apparatus (hereinafter also referred to as "present-invention apparatus") according to the present invention includes following target vehicle detection means, predicted cutting-in vehicle detection means, first acceleration acquisition means, second acceleration acquisition means, target acceleration acquisition means, travel control means, cutting-in probability acquisition means, and information notification means (driving support ECU 20).

The following target vehicle detection means is configured to detect a "following target vehicle" traveling ahead of an own vehicle (10) (Step 805 to Step 810 of FIG. 6).

The predicted cutting-in vehicle detection means is configured to detect a "predicted cutting-in vehicle" predicted to carry out cutting-in of merging between the own vehicle and the following target vehicle (Step 635 to Step 660 of FIG. 6).

The first acceleration acquisition means is configured to acquire, as a "first acceleration (A1)", an acceleration of the own vehicle required to cause an inter-vehicle distance (Dxf) between the own vehicle and the following target vehicle to be a predetermined first inter-vehicle distance (first inter-vehicle distance Dxt1) (FIG. 8).

The second acceleration acquisition means is configured to acquire, as a "second acceleration (A2)", an acceleration of the own vehicle required to cause an inter-vehicle distance (Dxi) between the own vehicle and the predicted cutting-in vehicle to be a predetermined second inter-vehicle distance (second inter-vehicle distance Dxt2) (FIG. 9).

The target acceleration acquisition means is configured to acquire a "target acceleration (Atgt)" of the own vehicle based on the first acceleration and the second acceleration (Step 670 to Step 675 and Step 695 of FIG. 6).

The travel control means is configured to control a driving force and a braking force of the own vehicle such that an actual acceleration of the own vehicle approaches the target acceleration (Step 680 of FIG. 6).

The cutting-in probability acquisition means is configured to acquire a cutting-in probability (Pi), which is a probability that the predicted cutting-in vehicle carries out the cutting-in (FIG. 3).

The information notification means is configured to notify a driver of the own vehicle of an "intention of the cutting-in of the predicted cutting-in vehicle" from a time point when a "notification start condition" that a state where the cutting-in probability is higher than a predetermined start probability threshold (second probability threshold Pth2) (first state) has continued for a predetermined period is satisfied to a time point when a "notification end condition" that a state where the cutting-in probability is lower than a predetermined end probability threshold (second probability threshold Pth2) (second state) has continued for a predetermined period is satisfied (FIG. 4 and Step 685 to Step 690 and Step 697 of FIG. 6).

For example, the cutting-in probability can be acquired based on a "distance (lateral distance) in a lateral direction of the own vehicle" between the own vehicle and the predicted cutting-in vehicle and a change amount (relative lateral speed) in the lateral distance per unit period. In this example, the cutting-in probability can be set so as to increase as the absolute value of the lateral distance decreases, and to increase as the absolute value of the relative lateral speed increases (refer to FIG. 3). Alternatively, a period until the predicted cutting-in vehicle completes the cutting-in can be acquired (predicted), to thereby set the cutting-in probability so as to increase as the period decreases.

In any case, the relative lateral speed may temporarily decrease when a driver of the predicted cutting-in vehicle hesitates to cut in, or checks safety during a period from the start to the completion of the cutting-in, and, consequently, the cutting-in probability may temporarily decrease. Alternatively, the driver of the predicted cutting-in vehicle may stop the cutting-in and may return to the original lane.

As a result, a phenomenon may occur in which the state changes to the first state, then temporarily changes to the second state and returns to the first state, and then the cutting-in finishes. Further, a phenomenon may occur in which the cutting-in is stopped after the state temporarily changes to the first state, and then the state returns to the second state.

Therefore, in a case where the notification is started when the state changes to the first state, and is finished when the state changes to the second state, a phenomenon in which the started notification is temporarily stopped and then immediately resumed, and a phenomenon in which the started notification is immediately finished may occur. When those phenomena (hereinafter also referred to as "display inversion phenomena") occur, there is fear that the driver of the own vehicle feels a sense of discomfort.

On the other hand, the present-invention apparatus starts the notification when the notification start condition is satisfied and finishes the notification when the notification end condition is satisfied, and can thus prevent the notification state from changing due to a temporary variation in the cutting-in probability. As a result, the occurrence of the display inversion phenomenon is highly likely to be avoided. Thus, with the present-invention apparatus, the presence of the predicted cutting-in vehicle can be notified to the driver of the own vehicle at the appropriate timing while the occurrence of the display inversion phenomenon is avoided.

According to one aspect of the present-invention apparatus, the information notification means is configured to:

acquire a "smoothed probability (Ps)" acquired by smoothing a change in the cutting-in probability with respect to time (Step 640 of FIG. 6);

determine that the notification start condition is satisfied when the smoothed probability transitions from a state where the smoothed probability is lower than the start probability threshold to a state where the smoothed probability is higher than the start probability threshold (Step 685 to Step 690 of FIG. 6); and determine that the notification end condition is satisfied when the smoothed probability transitions from a state where the smoothed probability is higher than the end probability threshold to a state where the smoothed probability is lower than the end probability threshold (Step 685 to Step 697 of FIG. 6).

The cutting-in probability changes with short steps as time elapses, and consequently may temporarily increase or decrease. On the other hand, the smoothed probability is slow in a change per unit period compared with the cutting-in probability.

Therefore, a certain amount of time is required after the state in which the cutting-in probability is lower than the start probability threshold transitions to the state in which the cutting-in probability is higher than the start probability threshold until the state in which the smoothed probability is lower than the start probability threshold transitions to the state in which the smoothed probability is higher than the start probability threshold. Similarly, a certain amount of time is required after the state in which the cutting-in probability is higher than the start probability threshold transitions to the state in which the cutting-in probability is lower than the start probability threshold until the state in which the smoothed probability is higher than the start probability threshold transitions to the state in which the smoothed probability is lower than the start probability threshold.

Thus, according to this aspect, simple processing based on the smoothed probability can be used to respectively determine whether or not the notification start condition is satisfied and whether or not the notification end condition is satisfied.

According to another aspect of the present-invention apparatus, the information notification means is configured to:

determine a "merging direction" of the predicted cutting-in vehicle based on a movement direction of the predicted cutting-in vehicle with respect to the own vehicle when the notification start condition is satisfied (Step 645 to Step 650 of FIG. 6); and notify the driver of the merging direction when the intention of the cutting-in of the predicted cutting-in vehicle is notified to the driver (FIG. 4).

The sign of the relative lateral speed may temporarily invert during the period from the start to the end of the merging of the predicted cutting-in vehicle (for example, refer to the relative lateral speed, which is the change amount per unit period in the lateral position, illustrated in an ellipsoid E1 of FIG. 5A to FIG. 5C). In this case, when the merging direction of the predicted cutting-in vehicle is determined at any time based on the travel direction (in this example, the relative lateral speed), and the determination result is notified to the driver, the notified merging direction temporarily inverts. As a result, there is a fear that the driver of the own vehicle feels the sense of discomfort.

However, according to this aspect, the notification including the merging direction determined based on the travel direction of the predicted cutting-in vehicle at the time point when the notification start condition is satisfied (namely, the time point when the first state has continued for the predetermined period) continues until the notification end condition is satisfied. Thus, with the present-invention apparatus, the temporary inversion of the notified merging direction of the predicted cutting-in vehicle is highly likely to be avoided, and, thus, the sense of discomfort felt by the driver can be avoided.

In the above description, the terms and/or reference symbols used in an embodiment of the present invention described later are enclosed in parentheses and assigned to the components of the present invention corresponding to the embodiment for easier understanding of the present invention. However, the constituent elements of the present invention are not limited to the embodiment defined by the terms and/or reference symbols. Other objects, other features, and accompanying advantages of the present invention are easily understandable from the description of the embodiment of the present invention to be given with reference to the following drawings.

BRIEF DESCRIPTION OF THE DRAWINGS

FIG. 4 is a diagram for illustrating a cutting-in vehicle symbol for notifying presence of a predicted cutting-in vehicle.

FIG. 5A, FIG. 5B, and FIG. 5C are time charts for showing respective changes in the lateral distance, the cutting-in probability, a smoothed probability, and a display state of the cutting-in vehicle symbol.

DETAILED DESCRIPTION OF THE PREFERRED EMBODIMENTS

Figure 1:
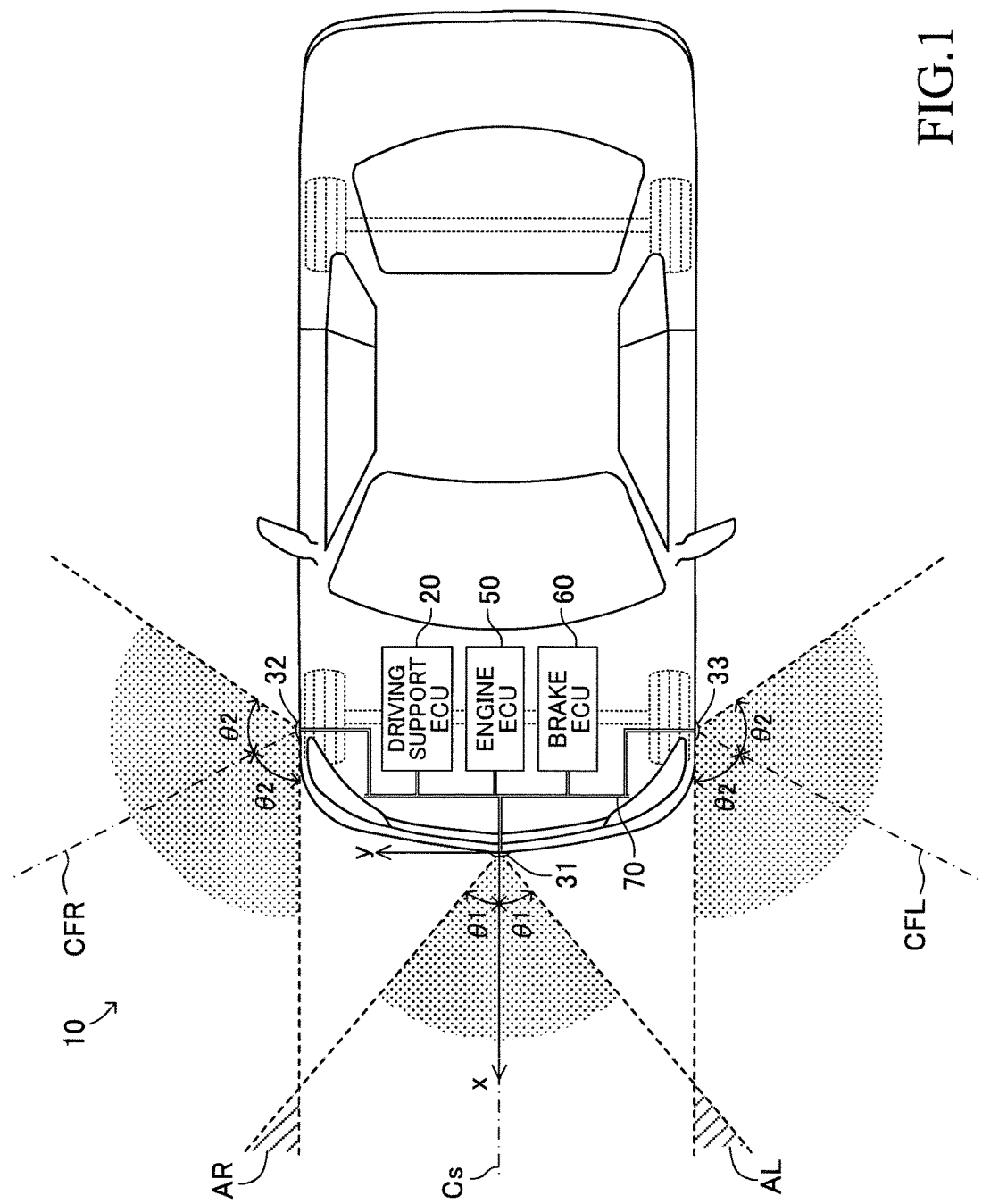
FIG. 1 is a schematic diagram for illustrating a vehicle to which a vehicle travel control apparatus (present control apparatus) according to an embodiment of the present invention is applied.

A description is now given of a vehicle travel control apparatus (hereinafter also referred to as "present control apparatus") according to an embodiment of the present invention referring to the drawings. The present control apparatus is applied to a vehicle 10 illustrated in FIG. 1. The vehicle 10 includes a driving support ECU 20, an engine ECU 50, and a brake ECU 60, which are electronic control units (ECUs).

Figure 2:
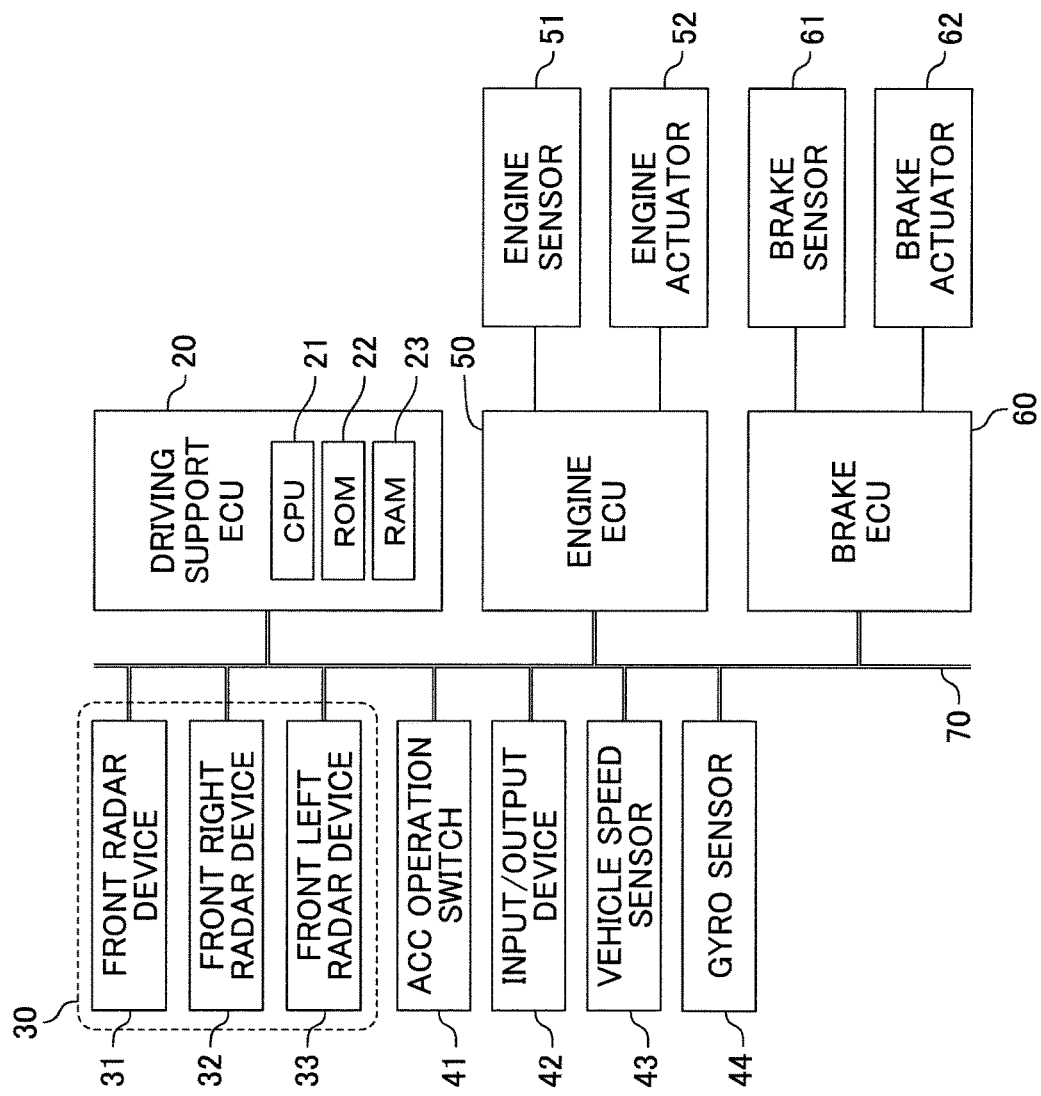
FIG. 2 is a detailed configuration diagram for illustrating the present control apparatus.

As illustrated in FIG. 2, the driving support ECU 20 includes a CPU 21, a ROM 22, and a RAM 23. The CPU 21 is configured to sequentially execute a predetermined program (routine), to thereby, for example, read data, calculate numerical values, and output calculation results. The ROM 22 stores the programs executed by the CPU 21, lookup tables (maps), and the like. The RAM 23 temporarily stores data. Each of the engine ECU 50 and the brake ECU 60 includes a CPU, a ROM, and a RAM as in the driving support ECU 20.

The driving support ECU 20, the engine ECU 50, and the brake ECU 60 are configured to be able to communicate data (exchange data) to/from one another via a communication/sensor system controller area network (CAN) 70. In more detail, the driving support ECU 20 is configured to be able to communicate data via the CAN 70 to/from radar devices 30, an ACC operation switch 41, an input/output device 42, a vehicle speed sensor 43, and a gyro sensor 44.

The radar devices 30 include a front radar device 31, a front right radar device 32, and a front left radar device 33. The front radar device 31 includes a transmission unit, a reception unit, and a processing unit. As illustrated in FIG. 1, the front radar device 31 is arranged at a front end of the vehicle 10, and in a center portion in a vehicle width direction. The transmission unit is configured to transmit a millimeter wave (electromagnetic wave having a frequency in a range of from 30 GHz to 300 GHz) that propagates while presenting a spread having a center axis Cs extending in a straight front direction of the vehicle 10, and a predetermined angle θ1 in each of a left direction and a right direction with respect to the center axis Cs.

In the following, the direction of the center axis Cs (namely, the longitudinal direction of the vehicle 10) is defined as an x coordinate axis, and a lateral direction of the vehicle 10 orthogonal to the center axis Cs is defined as a y coordinate axis. The x coordinate has a positive value in the front direction of the vehicle 10, and has a negative value in the rear direction of the vehicle 10. The y coordinate has a positive value in the right direction of the vehicle 10, and has a negative value in the left direction of the vehicle 10. A position at the front end of the vehicle 10 and in the center portion in the vehicle width direction is the origin where x=0 and y=0.

A part of the millimeter wave transmitted from the transmission unit of the front radar device 31 is reflected by an object (e.g., a vehicle (another vehicle) other than the vehicle 10), and is received by the reception unit of the front radar device 31. The processing unit of the front radar device 31 is configured to acquire an inter-vehicle distance (longitudinal distance) Dx, a relative longitudinal speed Vx, a lateral distance Dy, a relative lateral speed Vy, and the like for each of the detected objects based on a phase difference between the millimeter wave transmitted by the transmission unit and the millimeter wave (reflected wave) received by the reception unit, an attenuation degree of the reflected wave, a period from the transmission of the millimeter wave to the reception of the reflected wave, and the like each time a predetermined period has elapsed.

Those pieces of information on the object are also generally referred to as "object information". The processing unit is configured to transmit the object information to the driving support ECU 20 via the CAN 70. When a plurality of objects are detected, the processing unit transmits object information on each of the objects to the driving support ECU 20.

As illustrated in FIG. 1, the front right radar device 32 is arranged on a body front right portion of the vehicle 10. The front right radar device 32 has the same configuration as that of the front radar device 31. The transmission unit of the front right radar device 32 is configured to transmit a millimeter wave that propagates while presenting a spread having a center axis CFR extending in an obliquely front right direction of the vehicle 10, and a predetermined angle θ2 in each of the vehicle front and rear directions with respect to the center axis CFR.

The reception unit of the front right radar device 32 is configured to receive a reflected wave of the millimeter wave transmitted by the transmission unit of the front right radar device 32. The processing unit of the front right radar device 32 is configured to acquire the object information based on the transmitted millimeter wave and the received reflected wave. The processing unit of the front right radar device 32 is configured to transmit the acquired object information to the driving support ECU 20 via the CAN 70.

As illustrated in FIG. 1, the front left radar device 33 is arranged on a body front left portion of the vehicle 10. The front left radar device 33 has the same configuration as that of the front radar device 31. The transmission unit of the front left radar device 33 is configured to transmit a millimeter wave that propagates while presenting a spread having a center axis CFL extending in an obliquely front left direction of the vehicle 10, and the predetermined angle θ2 in each of the vehicle front and rear directions with respect to the center axis CFL.

The reception unit of the front left radar device 33 is configured to receive a reflected wave of the millimeter wave transmitted by the transmission unit of the front left radar device 33. The processing unit of the front left radar device 33 is configured to acquire the object information based on the transmitted millimeter wave and the received reflected wave. The processing unit of the front left radar device 33 is configured to transmit the acquired object information to the driving support ECU 20 via the CAN 70.

As appreciated from FIG. 1, a detection region of the front radar device 31 and a detection region of the front right radar device 32 include a mutually overlapping portion (overlap region AR). Similarly, the detection region of the front radar device 31 and a detection region of the front left radar device 33 include a mutually overlapping portion (overlap region AL). Therefore, an object within the overlap region AR is detected by both the front radar device 31 and the front right radar device 32, and an object within the overlap region AL is detected by both the front radar device 31 and the front left radar device 33.

When an object (specifically, a portion of the object that reflects the millimeter wave from the radar device) is located ahead of the radar device for detecting the object in the travel direction of the vehicle 10, the inter-vehicle distance Dx is a distance in the x axis direction between the "front end of the vehicle 10" and a "rear end of the object". On the other hand, when an object is located behind the radar device for detecting the object in the travel direction of the vehicle 10, the inter-vehicle distance Dx is a distance in the x axis direction between the "front end of the vehicle 10" and a "front end of the object".

The relative longitudinal speed Vx is a change amount per unit period of the inter-vehicle distance Dx. The lateral distance Dy is a distance between a "center position in the vehicle width direction of the vehicle 10" and a "center position in the y axis direction of the object (e.g., a center position in the vehicle width direction of another vehicle)". The relative lateral speed Vy is a change amount per unit period of the lateral distance Dy.

Referring to FIG. 2 again, the ACC operation switch 41 is operated by a driver of the vehicle 10 in order to switch an operation state of "inter-vehicle-distance-for-following control (adaptive cruise control (ACC))" between operation (ON) and stop (OFF). The inter-vehicle-distance-for-following control is also simply referred to as "following travel control".

The input/output device 42 is arranged in a center console (not shown) provided in a vehicle cabin of the vehicle 10. The input/output device 42 includes a display device (display), and characters, graphics, and the like displayed on the display device are controlled by the driving support ECU 20. The display device of the input/output device 42 also operates as a touch panel. Thus, the driver can touch the display device to transmit a command to the driving support ECU 20. Further, the input/output device 42 includes a sound production device (not shown). The input/output device 42 is configured to be able to follow a command of the driving support ECU 20 to carry out reproduction of an alarm sound, an announcement, and the like.

The vehicle speed sensor 43 is configured to detect a vehicle speed Vs of the vehicle 10, and output a signal representing the vehicle speed Vs. The gyro sensor 44 is a three-axis angular velocity sensor, and is configured to output a signal indicating angular velocities in the x axis direction, the y axis direction, and a z axis direction perpendicular to each of the x axis and the y axis of the vehicle 10. In other words, the gyro sensor 44 is configured to output a signal indicating change amounts per unit period of the roll angle, the pitch angle, and the yaw angle.

The engine ECU 50 is connected to a plurality of engine sensors 51, and is configured to receive detection signals of those sensors. The engine sensor 51 is a sensor configured to detect an operation state amount of a "gasoline-fuel-injection type spark-ignition internal combustion engine serving as a drive source of the vehicle 10" (not shown). The engine sensors 51 include an accelerator pedal operation amount sensor, a throttle valve opening degree sensor, an engine rotational speed sensor, and an intake air amount sensor.

Further, the engine ECU 50 is connected to engine actuators 52, e.g., a throttle valve actuator and fuel injection valves. The engine ECU 50 is configured to drive the engine actuators 52 so as to change a torque Tq generated by the internal combustion engine, thereby adjusting a driving force of the vehicle 10 for controlling an acceleration As (change amount of the vehicle speed Vs per unit period).

The brake ECU 60 is connected to a plurality of brake sensors 61, and is configured to receive detection signals of those sensors. The brake sensor 61 is a sensor configured to detect a parameter used when a "braking device (hydraulic friction braking device) installed on the vehicle 10" (not shown) is controlled. The brake sensors 61 include a brake pedal operation amount sensor and a wheel speed sensor configured to detect a rotational speed of each wheel.

Further, the brake ECU 60 is connected to a brake actuator 62. The brake actuator 62 is a hydraulic control actuator. The brake actuator 62 is arranged in a hydraulic circuit between a master cylinder configured to pressurize working fluid by a depression force on the brake pedal, and friction brake devices including well-known wheel cylinders, each of which is provided for each of the wheels (none of those devices are shown). The brake actuator 62 is configured to adjust the hydraulic pressure supplied to the wheel cylinder. The brake ECU 60 is configured to drive the brake actuator 62 to generate a braking force (friction braking force) Bf on each of the wheels, thereby adjusting the acceleration As (in this case, a negative acceleration, i.e., a deceleration) of the vehicle 10.

(Following Travel Control)

The driving support ECU 20 is configured to start the following travel control when the ACC operation switch 41 is switched from the off state to the on state by the driver of the vehicle 10. At the start of the following travel control, the driving support ECU 20 is configured to store the vehicle speed Vs at this time point in the RAM 23 as a set vehicle speed Vset. The driving support ECU 20 is configured to set a target acceleration Atgt of the vehicle 10 such that the vehicle speed Vs matches the set vehicle speed Vset when another vehicle (i.e., following target vehicle) traveling ahead of the vehicle 10 does not exist.

Further, the driving support ECU 20 is configured to make a request to the engine ECU 50 and the brake ECU 60 such that the actual acceleration As matches the target acceleration Atgt. In general, when the target acceleration Atgt is a positive value, the driving support ECU 20 requests the engine ECU 50 to increase the torque Tq. When the target acceleration Atgt is a negative value, the driving support ECU 20 requests the engine ECU 50 to decrease the torque Tq. When the target acceleration Atgt is a negative value and has a relatively large absolute value, the driving support ECU 20 requests the engine ECU 50 to cause the torque Tq to be "0", and requests the brake ECU 60 to generate the braking force Bf.

On the other hand, the driving support ECU 20 is configured to determine, when a following target vehicle exists, a first acceleration A1 such that an inter-vehicle distance for following Dxf, which is the inter-vehicle distance Dx to the following target vehicle, reaches a predetermined first inter-vehicle distance Dxt1. Further, the driving support ECU 20 is configured to set the target acceleration Atgt to the first acceleration A1.

The following target vehicle is a vehicle located ahead of the vehicle 10 in a lane (own lane) in which the vehicle 10 is traveling, and is closest to the vehicle 10 out of other vehicles. The driving support ECU 20 is configured to determine that the following target vehicle no longer exists when the inter-vehicle distance for following Dxf becomes more than a predetermined following limit distance Dxth. The following limit distance Dxth is a distance that is more than the first inter-vehicle distance Dxt1 (i.e., Dxth>Dxt1).

The driving support ECU 20 is configured to finish the following travel control when the ACC operation switch 41 is switched from the on state to the off state by the driver of the vehicle 10, or the driver operates the brake pedal.

(Cutting-in Vehicle Prediction Processing)

The driving support ECU 20 carries out "cutting-in vehicle prediction processing" while the following travel control is being carried out. More specifically, the driving support ECU 20 is configured to extract an object (another vehicle) that is detected by the radar devices 30, travels in a lane (another lane) different from the own lane, and is likely to merge into the own lane as a predicted merging vehicle.

A distance (inter-vehicle distance Dx) between a position (predicted merging position) at which the predicted merging vehicle completes the merging to the own lane and the position of the vehicle 10 at that time point is referred to as predicted merging distance Dxj. When the predicted merging position is behind the position of the vehicle 10, the predicted merging distance Dxj is a negative value (i.e., Dxj<0). When the predicted merging position is between the position of the following target vehicle and the position of the vehicle 10, the predicted merging vehicle is also referred to as "predicted cutting-in vehicle". When the "predicted cutting-in vehicle" completes the merging to the own lane, this predicted cutting-in vehicle becomes a new following target vehicle.

The driving support ECU 20 is configured to acquire a cutting-in probability Pi, which is a probability that the predicted cutting-in vehicle actually cuts in, based on the lateral distance Dy and the relative lateral speed Vy of the predicted cutting-in vehicle. More specifically, the driving support ECU 20 is configured to apply the lateral distance Dy and the relative lateral speed Vy of the predicted cutting-in vehicle to a "relationship among the lateral distance Dy, the relative lateral speed Vy, and the cutting-in probability Pi" illustrated in FIG. 3 to acquire the cutting-in probability Pi corresponding to this predicted cutting-in vehicle.

Figure 3:
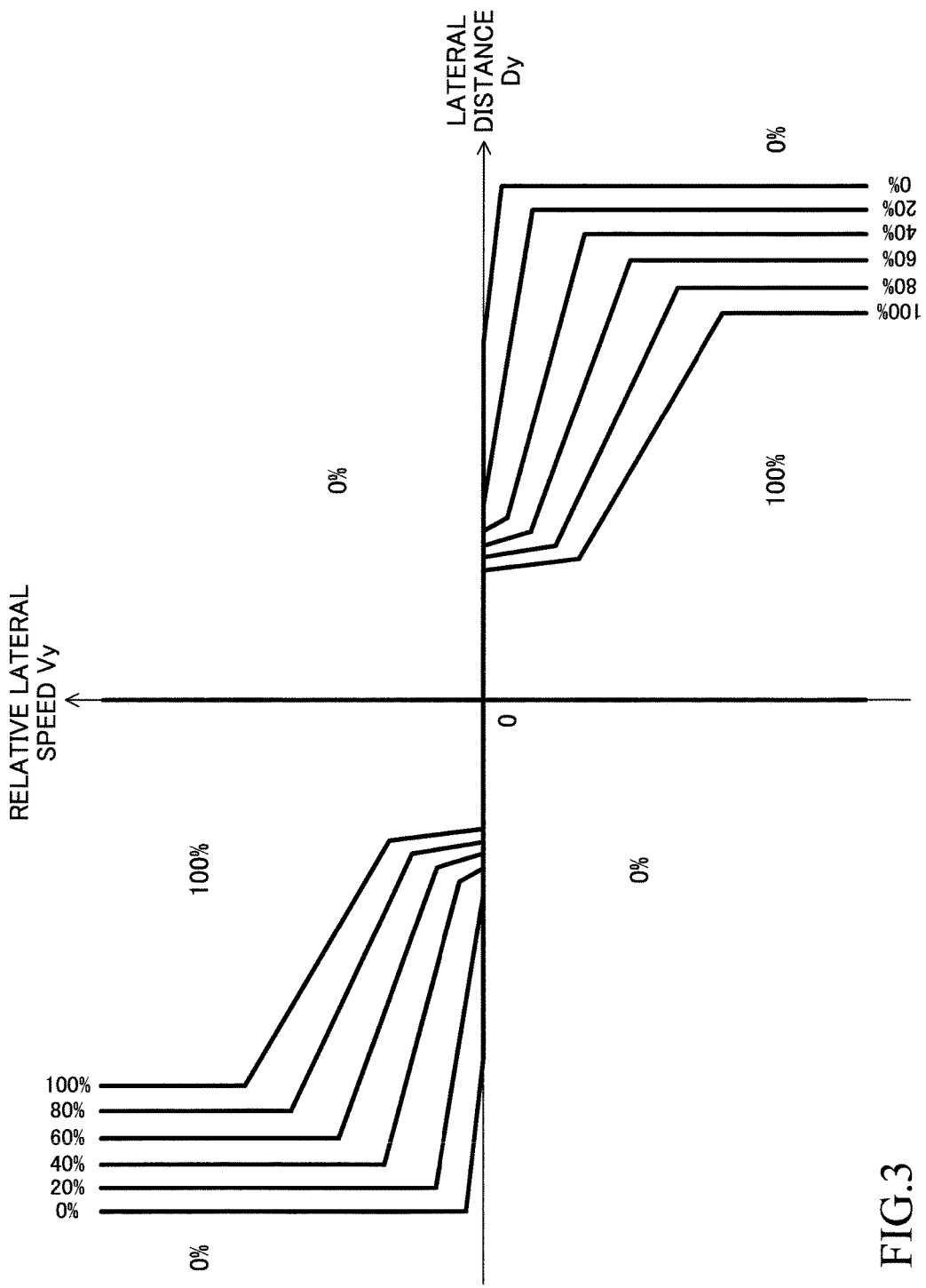
FIG. 3 is a graph for showing a relationship among a lateral distance, a relative lateral speed, and a cutting-in probability.

As appreciated from FIG. 3, when the signs of the lateral distance Dy and the relative lateral speed Vy are equal to each other (i.e., Dx×Vy>0), the cutting-in probability Pi is 0%. When the signs of the lateral distance Dy and the relative lateral speed Vy are different from each other (i.e., Dx×Vy<0), in general, the cutting-in probability Pi increases as the absolute value of the lateral distance Dy decreases, and the cutting-in probability Pi increases as the absolute value of the relative lateral speed Vy increases. The relationship illustrated in FIG. 3 is stored in the ROM 22 in the form of a lookup table.

When the cutting-in probability Pi corresponding to the predicted cutting-in vehicle is higher than a predetermined first probability threshold Pth1 (40% in this example) (i.e., Pi>Pth1), the predicted cutting-in vehicle is also referred to as "potential vehicle for following". The driving support ECU 20 is configured to determine, when a potential vehicle for following exists, a second acceleration A2 such that a cutting-in inter-vehicle distance Dxi, which is the inter-vehicle distance Dx to the potential vehicle for following, reaches a predetermined second inter-vehicle distance Dxt2. Further, the driving support ECU 20 is configured to set the target acceleration Atgt to a smaller value of the first acceleration A1 and the second acceleration A2.

(Notification of Predicted Cutting-in Vehicle)

The driving support ECU 20 is configured to notify, when the predicted cutting-in vehicle is predicted to merge into the own lane, the driver of the vehicle 10 of the state where another vehicle is highly likely to merge between the following target vehicle and the vehicle 10. More specifically, the driving support ECU 20 is configured to display a cutting-in vehicle symbol 81 representing the "existence of the predicted cutting-in vehicle" and the "direction of the merging of the predicted cutting-in vehicle" as illustrated in an example of FIG. 4 on the display device of the input/output device 42. In addition, the driving support ECU 20 is configured to use the sound production device of the input/output device 42 to reproduce a sound notifying that the another vehicle is merging into the own vehicle lane.

In the example of FIG. 4, the following target vehicle 82 is displayed in addition to the cutting-in vehicle symbol 81. The cutting-in vehicle symbol 81 includes a predicted cutting-in vehicle 81a and a merging direction arrow 81b. In the example of FIG. 4, the predicted cutting-in vehicle 81a merging leftward from the right side with respect to the travel direction of the vehicle 10 between the vehicle 10 and the following target vehicle 82 is displayed. When the predicted cutting-in vehicle is predicted to merge rightward from the left side of the vehicle 10 into the own lane, the driving support ECU 20 displays a cutting-in vehicle symbol (i.e., predicted cutting-in vehicle and merging direction arrow) substantially symmetrical to the cutting-in vehicle symbol 81 about the center axis Cs on the input/output device 42.

A description is now given of a display start time point and a display end time point of the cutting-in vehicle symbol.

It is assumed that the driving support ECU 20 is configured to start the display of the cutting-in vehicle symbol when a "cutting-in vehicle notification condition", which is a condition that the "cutting-in probability Pi corresponding to the predicted cutting-in vehicle is higher than the predetermined second probability threshold Pth2 (40% in this example)", is satisfied, and to finish the display when the cutting-in vehicle notification condition is no longer satisfied. In this case, a phenomenon (display inversion phenomenon) may occur in which the state where the cutting-in vehicle symbol is displayed and the state where the cutting-in vehicle symbol is not displayed switch to the other after a short period of time.

Referring to FIG. 5A to FIG. 5C, a specific description is given. A solid line Ly of FIG. 5A is a graph (time chart) for indicating a change in the lateral distance Dy of the predicted cutting-in vehicle with respect to time. The predicted cutting-in vehicle travels on another lane whose lateral distance Dy to the vehicle 10 is a distance Dys, starts the lane change from the another lane to the own lane at a time point t0, and then completes the merge (cutting-in) between the vehicle 10 and the following target vehicle at a time point t6.

The distance Dys is a positive value (i.e., Dys>0), and therefore this predicted cutting-in vehicle merges leftward from the right side with respect to the travel direction of the vehicle 10. After the time point t6, the lateral distance Dy of this predicted cutting-in vehicle is approximately "0".

As appreciated from an ellipsoid E1, the lateral distance Dy of the predicted cutting-in vehicle temporarily takes a negative value immediately before the time point t6. In other words, this predicted cutting-in vehicle temporarily presents an overshoot during the merge into the own lane.

A solid line Ls1 of FIG. 5B represents an example of a change in the cutting-in probability Pi corresponding to the predicted cutting-in vehicle. For this predicted cutting-in vehicle, the cutting-in vehicle notification condition becomes satisfied at a time point t1, and immediately afterward, the cutting-in vehicle notification condition becomes dissatisfied at a time point t2. Then, the state where the cutting-in vehicle notification condition is satisfied continues for a while after a time point t3. The cutting-in vehicle notification condition becomes dissatisfied at a time point t4, and, immediately afterward, the cutting-in vehicle notification condition becomes satisfied at a time point t5. Further, the predicted cutting-in vehicle completes the cutting-in at the time point t6, and, as a result, the cutting-in vehicle notification condition becomes dissatisfied.

When the driving support ECU 20 displays the cutting-in vehicle symbol on the display device of the input/output device 42 in accordance with the cutting-in probability Pi represented by the solid line Ls1, timings of the displaying and the hiding of the cutting-in vehicle symbol are shown as a time chart represented by a solid line Ls2 of FIG. 5C. In other words, the display of the cutting-in vehicle symbol starts at the time point t1, the display is then stopped at the time point t2, and the display resumes at the time point t3. Then, after the cutting-in vehicle symbol display is stopped at the time point t4, the display is resumed at the time point t5. Further, the display of the cutting-in vehicle symbol is stopped at the time point t6.

In this case, as appreciated from an ellipsoid E2 and an ellipsoid E3 of FIG. 5C, the display inversion phenomenon occurs. As a result, the driver of the vehicle 10 is highly likely to feel a sense of discomfort.

In order to avoid the occurrence of the display inversion phenomenon, it is then assumed that the driving support ECU 20 is configured to start the display of the cutting-in vehicle symbol when the cutting-in vehicle notification condition is satisfied, and finishes the display of the cutting-in vehicle symbol after a predetermined period (constant period) has elapsed. In this case, for example, even when the predicted cutting-in vehicle starts the lane change from the another lane to the own lane, and then returns to the another lane without completing the lane change, the cutting-in vehicle symbol remains displayed. As a result, the driver of the vehicle 10 may feel the sense of discomfort.

Thus, in order to avoid the occurrence of the display inversion phenomenon, the driving support ECU 20 is configured to start the display of the cutting-in vehicle symbol after the state where the cutting-in vehicle notification condition is satisfied has continued for a while, and finish the display of the cutting-in vehicle symbol after the state where the cutting-in vehicle notification condition is dissatisfied has continued for a while. More specifically, the driving support ECU 20 is configured to acquire a smoothed probability Ps acquired by smoothing the change in the cutting-in probability Pi with respect to time through Equation (1) each time the cutting-in probability Pi is acquired.

$$Ps = \alpha \times Psold + (1-\alpha) \times Pi \quad (1)$$

In this equation, Psold is a value of the smoothed probability Ps acquired last time (i.e., a certain time is before) by the driving support ECU 20. $\alpha$ is a constant that is more than "0" and less than "1" (i.e., $0<\alpha<1$), and is "0.75" in this example (i.e., $\alpha=0.75$).

A change in the smoothed probability Ps is represented by the broken line Lb1 of FIG. 5B when the cutting-in probability Pi changes as represented by the solid line Ls1 of FIG. 5B. The smoothed probability Ps starts increasing as the cutting-in probability Pi increases after the time point t0. In addition, as a result of the state where the cutting-in probability Pi becomes approximately 0% at the time point t6, the smoothed probability Ps starts decreasing after the time point t6, and then becomes approximately 0%. As a result, the smoothed probability Ps is higher than the second probability threshold Pth2 from a time point t3a to a time point t6a.

As appreciated from FIG. 5A to FIG. 5C, while the cutting-in probability Pi represented by the solid line Ls1 changes with short steps as time elapses, the smoothed probability Ps represented by the broken line Lb1 is slow in the change per unit time.

As a result, a certain period elapses from the time point t3 at which the cutting-in probability Pi becomes higher than the second probability threshold Pth2 to the time point t3a at which the smoothed probability Ps becomes higher than the second probability threshold Pth2. Similarly, a certain period elapses from the time point t6 at which the cutting-in probability Pi becomes lower than the second probability threshold Pth2 to the time point t6a at which the smoothed probability Ps becomes lower than the second probability threshold Pth2.

On the other hand, after the cutting-in probability Pi becomes higher than the second probability threshold Pth2 at the time point t1, before the smoothed probability Ps becomes higher than the second probability threshold Pth2, the cutting-in probability Pi becomes lower than the second probability threshold Pth2 at the time point t2. As a result, the smoothed probability Ps does not become higher than the second probability threshold Pth2 from the time point t1 to the time point t2.

Thus, the smoothed probability Ps can be considered to become higher than the second probability threshold Pth2 when the certain period has elapsed after the cutting-in probability Pi becomes higher than the second probability threshold Pth2. Similarly, the smoothed probability Ps can be considered to become lower than the second probability threshold Pth2 when the certain period has elapsed after the cutting-in probability Pi becomes lower than the second probability threshold Pth2.

When the smoothed probability Ps corresponding to a predicted cutting-in vehicle is higher than the second probability threshold Pth2, the predicted cutting-in vehicle is also referred to as "display target vehicle". The driving support ECU 20 is configured to display the cutting-in vehicle symbol on the display device of the input/output device 42 when a display target vehicle exists. On the other hand, the driving support ECU 20 is configured not to display the cutting-in vehicle symbol when a display target vehicle does not exist.

In other words, the driving support ECU 20 displays the cutting-in vehicle symbol on the display device of the input/output device 42 from the time point t3a to the time point t6a as in the time chart represented by the broken line Lb2 of FIG. 5C. Thus, the display inversion phenomenon does not occur in this case.

In other words, the driving support ECU 20 is configured to determine that the "notification start condition" is satisfied when the state where the smoothed probability Ps is lower than the second probability threshold Pth2 transitions to the state where the smoothed probability Ps is higher than the second probability threshold Pth2, and determine that the "notification end condition" is satisfied when the state where the smoothed probability Ps is higher than the second probability threshold Pth2 transitions to the state where the smoothed probability Ps is lower than the second probability threshold Pth2. The second probability threshold Pth2 used to determine whether or not the notification start condition is satisfied is also referred to as "start probability threshold" for the sake of convenience. The second probability threshold Pth2 used to determine whether or not the notification end condition is satisfied is also referred to as "end probability threshold" for the sake of convenience.

In addition, the driving support ECU 20 is configured to determine, when the driving support ECU 20 starts the display of the cutting-in vehicle symbol at the time point t3a, the merging direction of the predicted cutting-in vehicle based on the relative lateral speed Vy at this time point. Specifically, the driving support ECU 20 is configured to determine that the merging direction is the right direction (rightward direction from the left side with respect to the travel direction of the vehicle 10) when the relative lateral speed Vy of the predicted cutting-in vehicle is a positive value (i.e., Vy>0). On the other hand, the driving support ECU 20 is configured to determine with the CPU that the merging direction is the left direction (leftward direction from the right side with respect to the travel direction of the vehicle 10) when the relative lateral speed Vy of the predicted cutting-in vehicle is a negative value (i.e., Vy<0).

The lateral distance Dy is decreasing at the time point t3a, and thus the relative lateral speed Vy of the predicted cutting-in vehicle at the time point t3a corresponding to the solid line Ly of FIG. 5A is a negative value (i.e., Vy<0). Thus, the driving support ECU 20 determines that the merging direction is the leftward direction from the right side, and displays the cutting-in vehicle symbol, e.g., the cutting-in vehicle symbol 81 illustrated in FIG. 4, on the display device of the input/output device 42.

The driving support ECU 20 does not change the merging direction represented by the displayed cutting-in vehicle symbol until the time point t6a. In other words, the predicted cutting-in vehicle is temporarily located on the left side with respect to the travel direction of the vehicle 10 (as a result, the sign of the relative lateral speed Vy temporarily inverts) immediately before the time point t6 (specifically, a time zone represented by the ellipsoid E1), and the driving support ECU 20 continues the display of the cutting-in vehicle symbol representing that the merging direction is the leftward direction from the right side of the vehicle 10. As a result, the temporary switch of the "merging direction represented by the cutting-in vehicle symbol" is avoided immediately before the time point t6.

(Specific Operation—Following Travel Control Processing)

A description is now given of a specific operation of the driving support ECU 20. The CPU 21 (hereinafter also simply referred to as "CPU") of the driving support ECU 20 is configured to execute a "following travel control processing routine" illustrated by the flowchart of FIG. 6 during the execution of the following travel control per every predetermined period (constant period ts). Thus, the CPU starts processing from Step 600 of FIG. 6 at an appropriate timing, sequentially carries out processing in Step 605 to Step 630 described later, and proceeds to Step 635.

Step 605: The CPU acquires information (i.e., object information) on an object detected by the radar devices 30 (i.e., front radar device 31, front right radar device 32, and front left radar device 33). When one radar device detects a plurality of objects, the CPU acquires the object information on each of the plurality of objects from the radar device.

Step 610: The CPU extracts moving objects included in the objects detected by the radar devices 30. Specifically, the CPU determines an object that has a changing position for a period more than a predetermined period with respect to a stationary object (e.g., a road surface and a building) as a moving object, and extracts the object information on each of the moving objects.

Step 615: The CPU aggregates the object information on an object (redundant object) detected by both the front radar device 31 and the front right radar device 32 in the overlap area AR. In other words, the CPU aggregates the two pieces of object information generated respectively by the two radar devices into a single piece of object information. When a plurality of redundant objects exist, the CPU aggregates pieces of object information on the redundant objects respectively. Similarly, the CPU aggregates object information on objects detected by both the front radar device 31 and the front left radar device 33 in the overlap area AL.

Step 620: The CPU removes oncoming vehicles from the extracted moving objects. Specifically, the CPU determines an object having a relative longitudinal speed Vx less than a predetermined negative threshold as the oncoming vehicle, and extracts the object information on moving objects other than the oncoming vehicles.

Step 625: The CPU determines whether a section (travel section) in which the vehicle 10 is traveling is a straight section or a curved section based on the signal (specifically, yaw rate, which is a change amount of the yaw angle per unit period) from the gyro sensor 44. When the travel section is a curved section, the CPU carries out a straight section correction depending on a curvature radius of the curved section, thereby correcting respective pieces of object information acquired from the radar devices 30 into pieces of object information in a case where the travel section is assumed to be a straight section.

Figure 7:
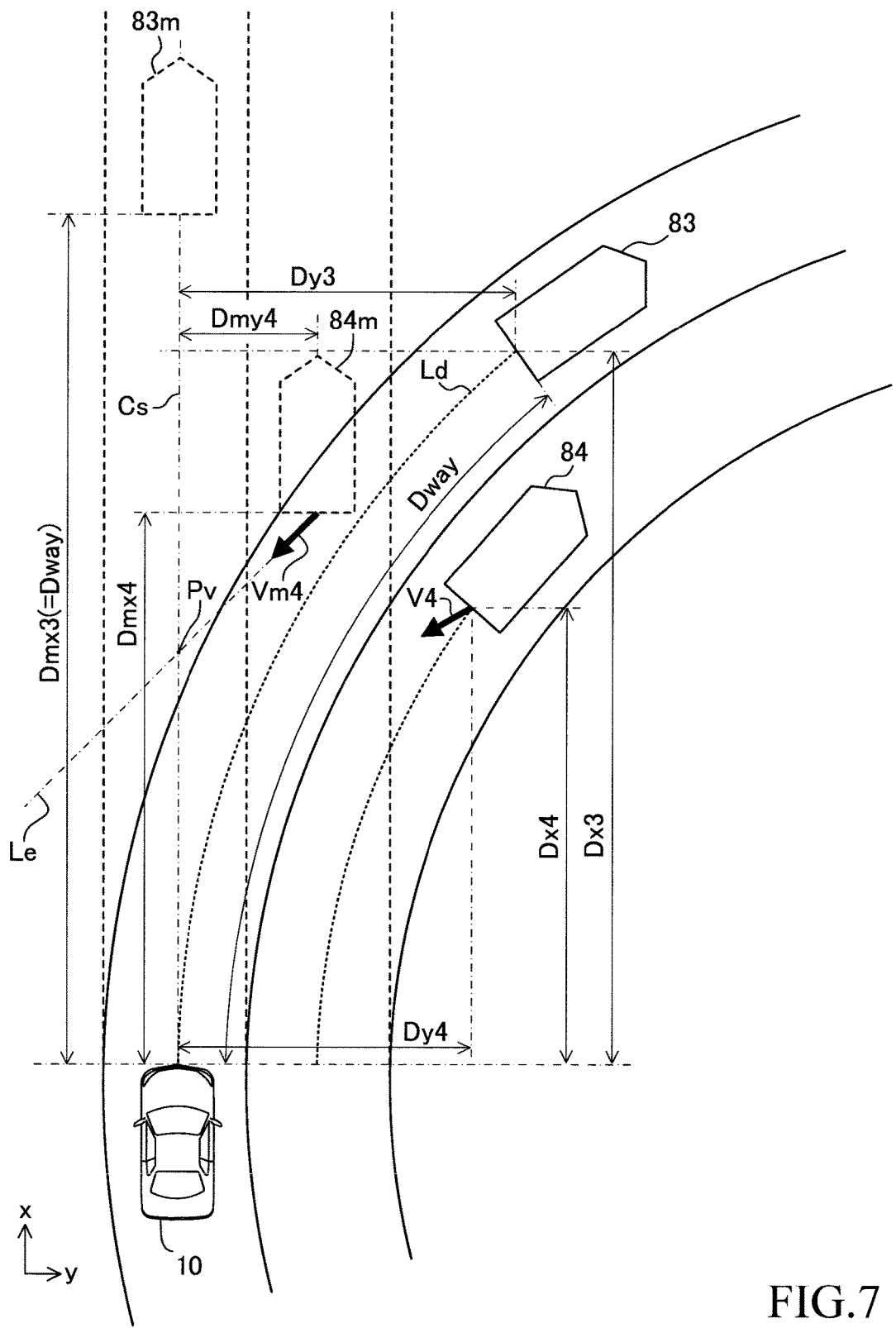
FIG. 7 is a diagram for illustrating an example of linear section correction processing executed by the present control apparatus.

Referring to an example of FIG. 7, a specific description is given. In FIG. 7, the vehicle 10 is traveling in a curved section curved rightward. In FIG. 7, the following target vehicle 83 and the predicted cutting-in vehicle 84 are illustrated. Positions of those vehicles in a case where the following target vehicle 83 and the predicted cutting-in vehicle 84 are assumed to travel in a straight section are indicated by a corrected vehicle position 83m and a corrected vehicle position 84m.

The inter-vehicle distance for following Dxf of the following target vehicle 83 acquired by the radar devices 30 is a distance Dx3. On the other hand, a path (travel trajectory of the following target vehicle 83 represented as the broken line Ld) predicted based on the curvature radius of the travel section of the vehicle 10 from the current position of the vehicle 10 to the current position of the following target vehicle 83 has a distance Dway. On this occasion, the CPU is configured to set a corrected inter-vehicle distance Dmx3 of the following target vehicle 83 to a value equivalent to the distance Dway (not the distance Dx3).

Similarly, the CPU is also configured to carry out the straight section correction for the lateral distance Dy, the relative longitudinal speed Vx, and the relative lateral speed Vy. The CPU is configured to use the straight section correction to convert (predict) a distance Dy3, which is the lateral distance Dy of the following target vehicle 83 detected by the radar devices 30, to a corrected lateral distance Dmy3 (approximately "0" in this example). Any of the relative longitudinal speed Vx and the relative lateral speed Vy of the following target vehicle 83 detected by the radar devices 30 and the corrected relative longitudinal speed Vx and relative lateral speed Vy of the following target vehicle 83 are approximately "0".

Similarly, the straight section correction is made for the object information on the predicted cutting-in vehicle 84. Specifically, the inter-vehicle distance Dx of the predicted cutting-in vehicle 84 acquired by the radar devices 30 is a distance Dx4, and the lateral distance Dy is a distance Dy4. In addition, the relative longitudinal speed Vx and the relative lateral speed Vy of the predicted cutting-in vehicle 84 are represented as a speed vector V4. An x axis component of the speed vector V4 represents the relative longitudinal speed Vx, and a y axis component represents the relative lateral speed Vy. Those pieces of object information are respectively converted to a corrected inter-vehicle distance Dmx4, a corrected lateral distance Dmy4, and a corrected speed vector Vm4 through the straight section correction.

Both of the speed vector of the following target vehicle 83 and the corrected speed vector of the following target vehicle 83 are approximately zero vectors, and are thus not shown. In order to avoid complicated notations, in the following, "corrected" added to the respective pieces of object information to which the straight section correction is made is omitted, and names and numerals before the correction are used for the description.

Figure 8:
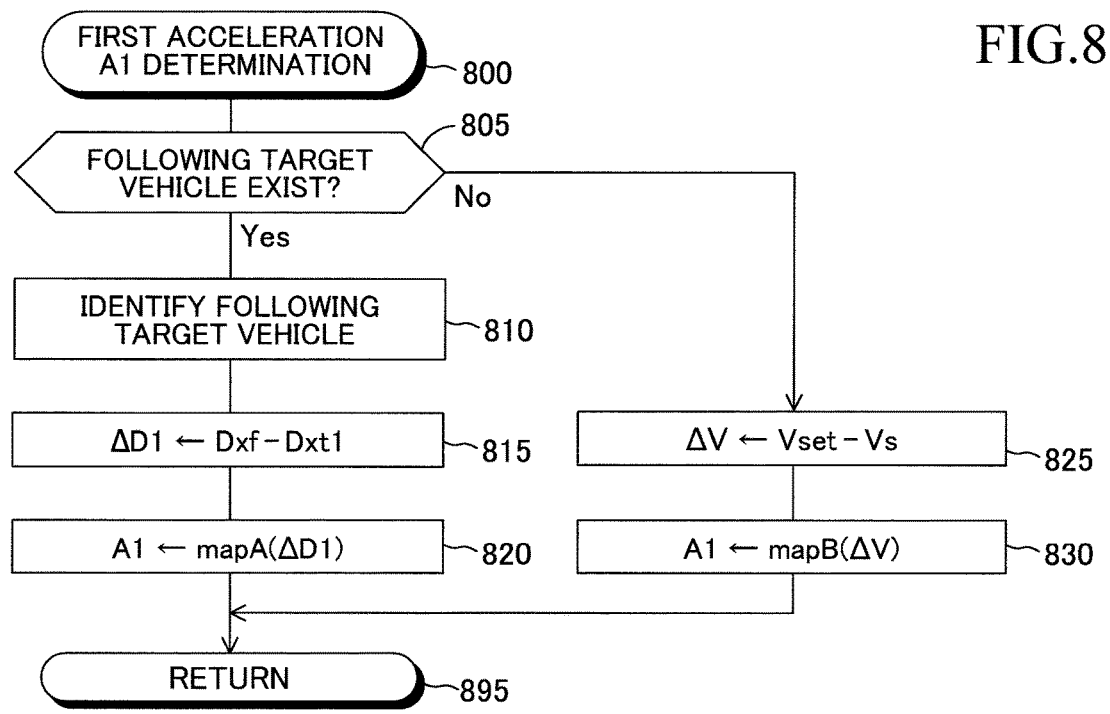
FIG. 8 is a flowchart for illustrating a first acceleration determination processing routine executed by the present control apparatus.

Step 630: The CPU executes a "first acceleration determination processing routine" illustrated in FIG. 8 to set the first acceleration A1. A detailed description is later given of this routine.

In Step 635, the CPU determines whether or not vehicles other than the following target vehicle exist. When vehicles other than the following target vehicle exist, in Step 635, the CPU makes a determination, "Yes", proceeds to Step 640, and acquires the cutting-in probability Pi and the smoothed probability Ps for each of the other vehicles. The CPU stores the acquired cutting-in probability Pi and smoothed probability Ps in the RAM 23.

Then, the CPU proceeds to Step 645, and determines whether or not the smoothed probability Ps corresponding to the another vehicle has become more than the second probability threshold Pth2 immediately before. In a case where the smoothed probability Ps is more than the second probability threshold Pth2 at the current time point, and the smoothed probability Ps was equal to or less than the second probability threshold Pth2 (including a case where the object information on the another vehicle was not acquired) when the CPU previously executed this routine, in Step 645, the CPU makes a determination, "Yes", and proceeds to Step 650.

In Step 650, the CPU determines the merging direction of the another vehicle, and stores the merging direction in the RAM 23. Then, the CPU proceeds to Step 655, and determines whether or not the above-mentioned processing has been carried out for all the vehicles other than the following target vehicle. When the object information (unprocessed object information) on the "another vehicle other than the following target vehicle" that has not been processed yet exists, in Step 655, the CPU makes a determination, "No", proceeds to Step 640, and carries out the processing for the unprocessed object information.

On the other hand, when unprocessed object information does not exist, in Step 655, the CPU makes a determination, "Yes", proceeds to Step 660, and determines whether or not a potential vehicle for following exists. As described above, the potential vehicle for following is a predicted merging vehicle, having the predicted merging position between the following target vehicle and the vehicle 10 (namely, the predicted cutting-in vehicle), and has the larger cutting-in probability Pi than the first probability threshold Pth1.

The CPU identifies an object (another vehicle) having an absolute value of the lateral distance Dy in a range equal to or more than a positive reference width Dyth, the absolute value of the lateral distance Dy decreasing, and having an absolute value of the relative lateral speed Vy more than a predetermined positive reference lateral speed Vyth as the predicted merging vehicle. In other words, the CPU identifies another vehicle satisfying any one of the following conditions (a) and (b) as the predicted merging vehicle. The reference width Dyth is an upper limit value of the magnitude of the lateral distance Dy that another vehicle traveling in the same lane as that of the vehicle 10 can usually take.

$$Dy \geq Dyth \text{ and } Vy < -Vyth \quad (a)$$

$$Dy \leq -Dyth \text{ and } Vy > Vyth \quad (b)$$

Further, the CPU acquires an intersection Pv, which is an intersection between a line (line Le of FIG. 7 in this example) connecting between a start point and an end point of a corrected speed vector (e.g., corrected speed vector Vm4 of FIG. 7) corresponding to the predicted merging vehicle and the center axis Cs, as a predicted merging position of the predicted merging vehicle. When the predicted merging position exists between the position of the following target vehicle and the position of the vehicle 10, the CPU identifies the predicted merging vehicle (predicted cutting-in vehicle 84 corresponding to the corrected vehicle position 84m of FIG. 7) as the predicted cutting-in vehicle.

In addition, the CPU identifies the predicted cutting-in vehicle as a potential vehicle for following when the cutting-in probability Pi for the predicted cutting-in vehicle is more than the first probability threshold Pth1. When there are a plurality of predicted cutting-in vehicles higher in the cutting-in probability Pi than the first probability threshold Pth1, the CPU identifies the predicted cutting-in vehicle having the shortest distance between the predicted merging position and the vehicle 10 as the potential vehicle for following.

Figure 9:
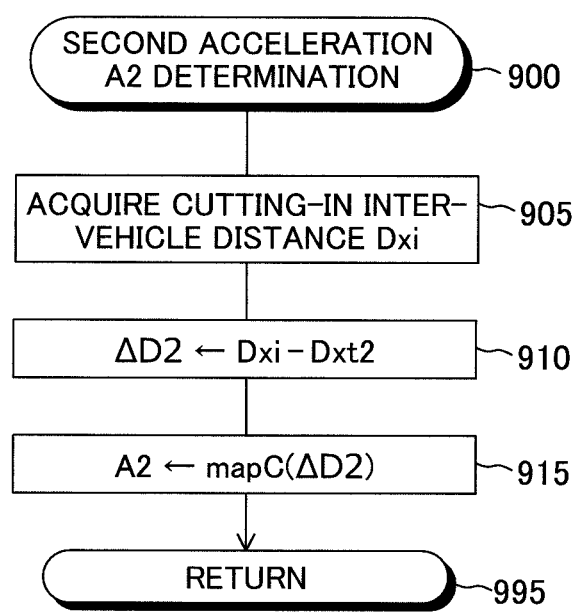
FIG. 9 is a flowchart for illustrating a second acceleration determination processing routine executed by the present control apparatus.

When a potential vehicle for following exists, in Step 660, the CPU makes a determination, "Yes", proceeds to Step 665, and executes a "second acceleration determination processing routine" illustrated in FIG. 9 for setting the second acceleration A2. A detailed description is later given of this routine.

Then, the CPU proceeds to Step 670, and determines whether or not the first acceleration A1 is equal to or more than the second acceleration A2. When the first acceleration A1 is equal to or more than the second acceleration A2, in Step 670, the CPU makes a determination, "Yes", proceeds to Step 675, and sets the target acceleration Atgt to a value equal to the second acceleration A2. Then, the CPU proceeds to Step 680.

On the other hand, when the first acceleration A1 is less than the second acceleration A2, in Step 670, the CPU makes a determination, "No", proceeds to Step 695, and sets the target acceleration Atgt to a value equal to the first acceleration A1. Then, the CPU proceeds to Step 680.

In Step 680, the CPU controls the engine actuators 52 and the brake actuator 62 via the engine ECU 50 and the brake ECU 60 such that the actual acceleration As reaches the target acceleration Atgt. When the following travel control is not being carried out, the engine ECU 50 executes a routine (not shown) to control the engine actuators 52 based on the detection signals of the engine sensors 51, and the brake ECU 60 executes a routine (not shown) to control the brake actuator 62 based on the detection signals of the brake sensors 61.

Further, the CPU proceeds to Step 685, and determines whether or not a display target vehicle (i.e., another vehicle which is a predicted cutting-in vehicle, and has the larger smoothed probability Ps than the second probability threshold Pth2) exists.

When a display target vehicle exists, in Step 685, the CPU makes a determination, "Yes", proceeds to Step 690, and notifies the driver of the vehicle 10 of the merging of the another vehicle. Specifically, the CPU displays the cutting-in vehicle symbol on the display device of the input/output device 42, and uses the sound production device of the input/output device 42 to reproduce a sound notifying that the another vehicle is merging into the own lane.

For the display of the cutting-in vehicle symbol, the CPU displays on the display device the cutting-in vehicle symbol indicating the merging direction stored when Step 650 is executed for the display target vehicle. When a plurality of display target vehicles exist, the CPU displays the cutting-in vehicle symbol indicating the merging direction corresponding to the display target vehicle having the shortest distance between the predicted merging position and the position of the vehicle 10. Then, the CPU proceeds to Step 699, and finishes this routine.

On the other hand, when a display target vehicle does not exist, in Step 685, the CPU makes a determination, "No", proceeds to Step 697, and does not carry out the processing of notifying the merging of the another vehicle. Specifically, when the cutting-in vehicle symbol is displayed on the display device of the input/output device 42, the CPU finishes the display of the cutting-in vehicle symbol. Further, when the sound is being reproduced by the sound production device of the input/output device 42, the CPU stops the reproduction. Then, the CPU proceeds to Step 699.

When vehicles other than the following target vehicle are not included in the object information, in Step 635, the CPU makes a determination, "No", and directly proceeds to Step 695. In addition, when the smoothed probability Ps has not become more than the second probability threshold Pth2 immediately before, in Step 645, the CPU makes a determination, "No", and directly proceeds to Step 655. Further, when a potential vehicle for following does not exist, in Step 660, the CPU makes a determination, "No", and directly proceeds to Step 695.

(Specific Operation—First Acceleration Determination Processing)

Figure 6:
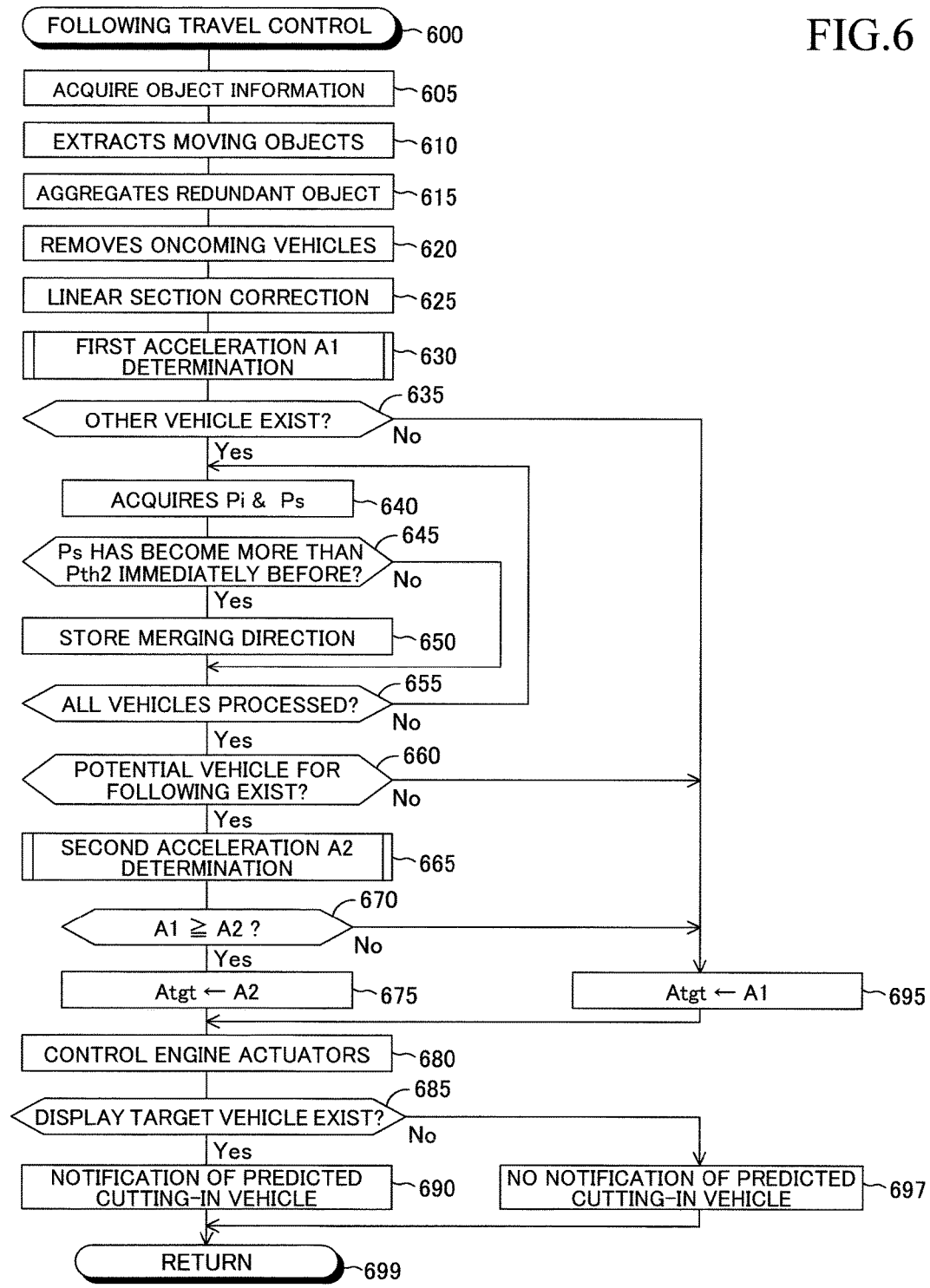
FIG. 6 is a flowchart for illustrating a following travel control processing routine executed by the present control apparatus.

A description is now given of the first acceleration determination processing routine. When Step 630 of FIG. 6 is carried out, the CPU starts processing from Step 800 of FIG. 8, proceeds to Step 805, and determines whether or not a following target vehicle exists.

Specifically, the CPU determines whether or not an object (another vehicle) exists in a region where the inter-vehicle distance Dx is less than the following limit distance Dxth, and the absolute value of the lateral distance Dy is less than the reference width Dyth (a region where Dx<Dxth and |Dy|<Dyth, namely, a region for following).

When another vehicle exists in the region for following, in Step 805, the CPU makes a determination, "Yes", proceeds to Step 810, and identifies a following target vehicle. Specifically, when the number of other vehicles existing in the range for following is one, the CPU identifies the another vehicle as the following target vehicle. On the other hand, when a plurality of other vehicles exist in the range for following, the CPU identifies the another vehicle having the shortest inter-vehicle distance Dx as the following target vehicle.

Then, the CPU proceeds to Step 815, and calculates a first inter-vehicle distance deviation ΔD1, which is a difference between the inter-vehicle distance for following Dxf of the identified following target vehicle and the first inter-vehicle distance Dxt1. Further, the CPU proceeds to Step 820, and applies the first inter-vehicle distance deviation ΔD1 to a lookup table mapA stored in the ROM 22, thereby determining the first acceleration A1. The first acceleration A1 is set to be a larger value as the first inter-vehicle distance deviation ΔD1 increases. Then, the CPU proceeds to Step 895, and finishes this routine.

On the other hand, when another vehicle does not exist in the region for following, in Step 805, the CPU makes a determination, "No", proceeds to Step 825, and calculates a vehicle speed deviation ΔV, which is a difference between the set vehicle speed Vset and the vehicle speed Vs. Further, the CPU proceeds to Step 830, and applies the vehicle speed deviation ΔV to a lookup table mapB stored in the ROM 22, thereby determining the first acceleration A1. The first acceleration A1 is set to be a larger value as the vehicle speed deviation ΔV increases. Then, the CPU proceeds to Step 895.

(Specific Operation—Second Acceleration Determination Processing)

A description is now given of the second acceleration determination processing routine. When Step 665 of FIG. 6 is carried out, the CPU starts processing from Step 900 of FIG. 9, carries out the processing from Step 905 to Step 915, and finishes this routine after proceeding to Step 995.

Step 905: The CPU acquires the cutting-in inter-vehicle distance Dxi, which is the inter-vehicle distance Dx between the potential vehicle for following identified when Step 660 of FIG. 6 is executed and the vehicle 10.

Step 910: The CPU calculates a second inter-vehicle distance deviation ΔD2, which is a difference between the cutting-in inter-vehicle distance Dxi and the second inter-vehicle distance Dxt2.

Step 915: The CPU applies the second inter-vehicle distance deviation ΔD2 to a lookup table mapC stored in the ROM 22, thereby determining the second acceleration A2. The second acceleration A2 is set to be a larger value as the second inter-vehicle distance deviation ΔD2 increases.

As described above, the driving support ECU 20 is configured to determine whether or not the notification start condition is satisfied, and whether or not the notification end condition is satisfied, based on the smoothed probability Ps, and can thus reduce the possibility of the occurrence of the display inversion phenomenon. In addition, the driving support ECU 20 is configured to notify the merging direction of the predicted cutting-in vehicle when the notification start condition is satisfied until the cutting-in vehicle notification condition is no longer satisfied, and thus the possibility of the temporary inversion of the notified merging direction can be reduced. Thus, with the present control apparatus, the occurrence of the display inversion phenomenon, and the sense of discomfort felt by the driver of the vehicle 10 caused by the temporary inversion of the merging direction can be avoided.

A description has been given of an embodiment of the vehicle travel control apparatus according to the present invention, but the present invention is not limited to the embodiment, and can be modified in various ways as long as the modification does not depart from the objects of the present invention. For example, in the driving support ECU 20 according to this embodiment, both of the threshold (start probability threshold) used for determining whether or not the notification start condition is satisfied and the threshold (end probability threshold) used for determining whether or not the notification end condition is satisfied are the second probability threshold Pth2. However, the start probability threshold and the end probability threshold may be values different from each other.

In addition, the driving support ECU 20 according to this embodiment is configured to acquire the cutting-in probability Pi based on the "relationship among the lateral distance Dy, the relative lateral speed Vy, and the cutting-in probability Pi" illustrated in FIG. 3. However, the driving support ECU 20 may be configured to acquire the cutting-in probability Pi with a method different from the above-mentioned method. For example, the driving support ECU 20 may be configured to acquire (estimate) a period Ti until the predicted cutting-in vehicle completes the cutting-in, and acquire the cutting-in probability Pi so as to increase the cutting-in probability Pi as the period Ti decreases. In this case, the driving support ECU 20 may be configured to acquire the absolute value of a value acquired by dividing the lateral distance Dy by the relative lateral speed Vy as the period Ti (i.e., Ti=|Dy/Vy|).

In addition, the driving support ECU 20 according to this embodiment is configured to acquire (calculate) the smoothed probability Ps through Equation (1) described above. However, the driving support ECU 20 may be configured to acquire the smoothed probability Ps with a method different from the above-mentioned method. For example, the driving support ECU 20 may be configured to acquire an average of the cutting-in probability Pi for a predetermined number of times acquired immediately before as the smoothed probability Ps.

In addition, the driving support ECU 20 according to this embodiment is configured to determine whether or not the notification start condition is satisfied, and whether or not the notification end condition is satisfied, based on the smoothed probability Ps. However, the driving support ECU 20 may be configured to determine whether or not the notification start condition and the notification end condition are satisfied without acquiring the smoothed probability Ps. For example, the driving support ECU 20 may be configured to determine that the notification start condition is satisfied when the state where the cutting-in probability Pi is higher than the second probability threshold Pth2 has continued for a predetermined period (first timer value), and determine that the notification end condition is satisfied when the state where the cutting-in probability Pi is lower than the second probability threshold Pth2 has continued for a predetermined period (second timer value).

In addition, the driving support ECU 20 according to this embodiment is configured to determine the second acceleration A2 by considering a predicted cutting-in vehicle corresponding to the cutting-in probability Pi as the potential vehicle for following when the cutting-in probability Pi is higher than the first probability threshold Pth1. However, the driving support ECU 20 may be configured to determine the second acceleration A2 for the predicted cutting-in vehicle independently of the cutting-in probability Pi.

In addition, the driving support ECU 20 according to this embodiment is configured to acquire the vehicle speed Vs when the following travel control starts as the set vehicle speed Vset. However, the set vehicle speed Vset may be changed after the following travel control starts. For example, the vehicle 10 may include a switch for increasing the set vehicle speed Vset and a switch for decreasing the set vehicle speed Vset, and the driving support ECU 20 may be configured to change the set vehicle speed Vset through operations on those switches by the driver.

In addition, the input/output devices, e.g., the ACC operation switch 41 and the input/output device 42, and the sensor devices, e.g., the vehicle speed sensor 43 and the gyro sensor 44 according to this embodiment, are connected to the driving support ECU 20 via the CAN 70. However, a part or an entirety of those input/output devices and the sensor devices may be connected to the driving support ECU 20 via an in-vehicle network other than the CAN 70, or may be directly connected to the driving support ECU 20.

What is claimed is:
1. A vehicle travel control apparatus, comprising:
following target vehicle detection means for detecting a following target vehicle traveling ahead of an own vehicle;
predicted cutting-in vehicle detection means for detecting a predicted cutting-in vehicle predicted to carry out cutting-in of merging between the own vehicle and the following target vehicle;
first acceleration acquisition means for acquiring, as a first acceleration, an acceleration of the own vehicle required to cause an inter-vehicle distance between the own vehicle and the following target vehicle to be a first inter-vehicle distance;
second acceleration acquisition means for acquiring, as a second acceleration, an acceleration of the own vehicle required to cause an inter-vehicle distance between the own vehicle and the predicted cutting-in vehicle to be a second inter-vehicle distance;
target acceleration acquisition means for acquiring a target acceleration of the own vehicle based on the first acceleration and the second acceleration;
travel control means for controlling a driving force and a braking force of the own vehicle, the travel control means configured to autonomously control the driving force and the braking force based on the target acceleration to cause an actual acceleration of the own vehicle to approach the target acceleration;
cutting-in probability acquisition means for acquiring a cutting-in probability, which is a probability that the predicted cutting-in vehicle carries out the cutting-in; and
information notification means for notifying a driver of the own vehicle of the cutting-in of the predicted cutting-in vehicle from a first time point to a second time point, wherein the first time point occurs when the cutting-in probability has been higher than a predetermined start probability threshold for a first fixed predetermined period of time to limit display inversion phenomena, and the second time point occurs when the cutting-in probability has been lower than a predetermined end probability threshold for a second fixed predetermined period of time to limit display inversion phenomena.

2. A vehicle travel control apparatus according to claim 1, wherein the information notification means is configured to:
acquire a smoothed probability acquired by smoothing a change in the cutting-in probability with respect to time;
determine that the notification start condition is satisfied when the smoothed probability transitions from a state where the smoothed probability is lower than the start probability threshold to a state where the smoothed probability is higher than the start probability threshold; and
determine that the notification end condition is satisfied when the smoothed probability transitions from a state where the smoothed probability is higher than the end probability threshold to a state where the smoothed probability is lower than the end probability threshold.

3. A vehicle travel control apparatus according to claim 1, wherein the information notification means is configured to:

determine a merging direction of the predicted cutting-in vehicle based on a movement direction of the predicted cutting-in vehicle in a vehicle width direction of the own vehicle with respect to the own vehicle when the notification start condition is satisfied; and notify the driver of the merging direction when the intention of the cutting-in of the predicted cutting-in vehicle is notified to the driver.

4. A vehicle travel control apparatus according to claim 2, wherein the information notification means is configured to:

determine a merging direction of the predicted cutting-in vehicle based on a movement direction of the predicted cutting-in vehicle in a vehicle width direction of the own vehicle with respect to the own vehicle when the notification start condition is satisfied; and notify the driver of the merging direction when the intention of the cutting-in of the predicted cutting-in vehicle is notified to the driver.

* * * * *